(12) United States Patent
Huang et al.

(10) Patent No.: US 11,917,277 B2
(45) Date of Patent: Feb. 27, 2024

(54) COMPACT OPTICAL IMAGING DEVICE WITH SHORTENED OPTICAL DISTANCE, IMAGING MODULE, AND ELECTRONIC DEVICE

(71) Applicant: HON HAI PRECISION INDUSTRY CO., LTD., New Taipei (TW)

(72) Inventors: Gwo-Yan Huang, New Taipei (TW); Chia-Chih Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 240 days.

(21) Appl. No.: 17/585,875

(22) Filed: Jan. 27, 2022

(65) Prior Publication Data
US 2022/0256060 A1    Aug. 11, 2022

(30) Foreign Application Priority Data
Feb. 9, 2021    (CN) .......................... 202110180577.5

(51) Int. Cl.
| H04N 23/55 | (2023.01) |
| G02B 13/00 | (2006.01) |
| G02B 9/60 | (2006.01) |
| H04N 23/51 | (2023.01) |

(52) U.S. Cl.
CPC ............. H04N 23/55 (2023.01); G02B 9/60 (2013.01); G02B 13/0045 (2013.01); H04N 23/51 (2023.01)

(58) Field of Classification Search
None
See application file for complete search history.

(56) References Cited

U.S. PATENT DOCUMENTS

| 11,796,773 B2* | 10/2023 | Jo ....................... G02B 13/0045 |
| 2022/0121008 A1* | 4/2022 | Liao ....................... H04N 23/55 |
| 2022/0252874 A1* | 8/2022 | Huang ............... G02B 27/0081 |
| 2022/0272240 A1* | 8/2022 | Liu ..................... G02B 13/0045 |
| 2023/0161135 A1* | 5/2023 | Lee ..................... G02B 13/0045 |
| | | 359/756 |
| 2023/0350165 A1* | 11/2023 | Chen .................. G02B 13/0045 |

FOREIGN PATENT DOCUMENTS

| CN | 111999859 A | 11/2020 |
| JP | 2014209163 A | 11/2014 |
| JP | 2017521686 A | 8/2017 |

* cited by examiner

*Primary Examiner* — Cynthia Segura
(74) *Attorney, Agent, or Firm* — ScienBiziP, P.C.

(57) ABSTRACT

A compact optical imaging device with short optical length and low sensitivity, for use in an imaging module and an electronic device, comprises first to fifth lenses and a filter. An image-side surface of the fourth lens is convex near an optical axis of the optical imaging device. An image-side surface of the fifth lens is concave near the optical axis. The optical imaging device satisfies formulas 0.03 mm/°<TL5/FOV<0.1 mm/° and 2.4 mm<TL4/FNO<2.9 mm, TL5 being a distance from an object-side surface of the fifth lens to an image plane of the optical imaging device along the optical axis, FOV being a maximum field of view, TL4 being a distance from an object-side surface of the fourth lens to the image plane along the optical axis, and FNO being a F-number of the optical imaging device.

20 Claims, 14 Drawing Sheets

COMPACT OPTICAL IMAGING DEVICE WITH SHORTENED OPTICAL DISTANCE, IMAGING MODULE, AND ELECTRONIC DEVICE

FIELD

The subject matter relates to optical technologies, and more particularly, to an optical imaging device, an imaging module having the optical imaging device, and an electronic device having the imaging module.

BACKGROUND

In recent years, the demand for compact imaging lenses has grown as the popularity of portable electronic products with the photographing function has increased. The light sensors of a general imaging lens mainly include CCD (Charge Coupled Device) and CMOS (Complementary Metal-Oxide Semiconductor Sensor). Furthermore, as advances in semiconductor manufacturing technology have allowed the pixel size of sensors to be reduced, and the resolution of compact imaging lens elements has gradually increased, there is an increasing demand for compact imaging lens elements featuring better imaging quality.

As the popularity of portable electronic products with high standard such as smart phone or PDA (personal digital assistant) has increased, the conventional compact optical imaging device for portable electronic products, such as having four lens elements, cannot meet the demand for higher-order optical imaging device which show great imaging quality with more pixels.

At present, a compact optical imaging device uses five lens elements therein to improve the imaging quality and the resolution of the optical imaging device. However, such optical imaging device has a long optical distance, which is problematic for installation in a compact camera device.

BRIEF DESCRIPTION OF THE DRAWINGS

Implementations of the present technology will now be described, by way of example only, with reference to the attached figures.

DETAILED DESCRIPTION

Figure 1:
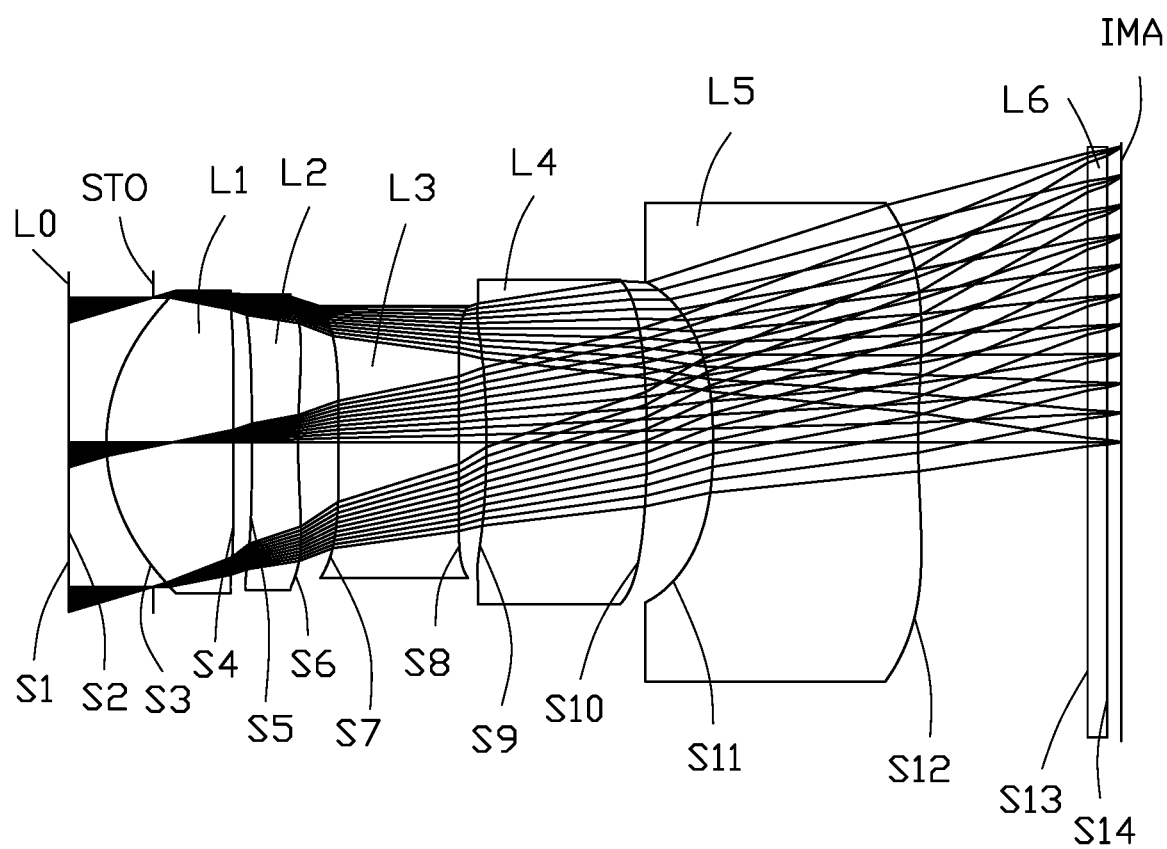
FIG. 1 is a diagrammatic view of a first embodiment of an optical imaging device according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The terms "first" and "second" are merely intended for a purpose of description, and shall not be understood as an indication or implication of relative importance or an implicit indication of a quantity of indicated technical features. Therefore, a feature modified by "first" or "second" may explicitly or implicitly include one or more such features. In the descriptions of the present invention, unless otherwise indicated, the meaning of "multiple" is two or more.

The term "comprising," when utilized, means "including, but not necessarily limited to"; it specifically indicates open-ended inclusion or membership in the so-described combination, group, series, and the like.

Referring to FIG. 1, a first embodiment of an optical imaging device 10 is provided. The optical imaging device 10 includes, from an object side to an image side, a first lens L1, a second lens L2, a third lens L3, a fourth lens L4, and a fifth lens L5. As needed for designing, an imaginary plane L0 is defined. The imaginary plane L0 includes an object-side surface S1 and an image-side surface S2.

The first lens L1 has a refractive power and includes an object-side surface S3 and an image-side surface S4. The second lens L2 has a refractive power and includes an object-side surface S5 and an image-side surface S6. The third lens L3 has a refractive power and includes an object-side surface S7 and an image-side surface S8. The fourth lens L4 has a negative refractive power and includes an object-side surface S9 and an image-side surface S10, the image-side surface S10 is convex near an optical axis. The fifth lens L5 has a negative refractive power and includes an object-side surface S11 and an image-side surface S12, the image-side surface S12 is concave near the optical axis.

The optical imaging device 10 satisfies the following formula (1):

$$0.03 \text{ mm}/° < TL5/FOV < 0.1 \text{ mm}/°, 2.4 \text{ mm} < TL4/FNO < 2.9 \text{ mm} \quad \text{(formula (1))}$$

TL5 is a distance from the object-side surface S11 of the fifth lens L5 to an image plane IMA of the optical imaging device 10 along the optical axis, FOV is the maximum field of view of the optical imaging device 10, TL4 is a distance from the object-side surface S9 of the fourth lens L4 to the image plane IMA of the optical imaging device 10 along the optical axis, FNO is a F-number of the optical imaging device 10.

Through control of the values of TF5/FOV and TL4/FNO, refraction angles of incident light are slowly and gradually changed as incident light enters the optical imaging device 10. Radical aberrations of the optical imaging device 10 are avoided, stray light is reduced, and the imaging quality is stable.

Through arrangements of the refractive powers and the contouring of the fourth lens L4 and the fifth lens L5, a rear focal length of the optical imaging device 10 is effectively reduced, thereby shortening a total optical length of the optical imaging device 10. The optical imaging device 10 has a small size, which can be applied in an electronic device of a small size. At the same time, an excessive refractive power of a single lens is avoided, thereby reducing the sensitivity of the optical imaging lens 10, the optical imaging lens 10 may have a stable imaging quality and may be manufactured easily. Therefore, a high refractive power is not concentrated in a single lens, the sensitivity of the optical imaging device 10 is reduced, and the optical imaging device 10 has a stable imaging quality and is easy to be manufactured.

The optical imaging device 10 also includes a stop STO disposed on a surface of any one of the lenses L1 to L5. The stop STO can also be disposed before the first lens L1. The stop STO can also be sandwiched between any two lenses. The stop STO can also be disposed on the image-side surface S12 of the fifth lens L5. For example, as shown in FIG. 1, the stop STO is disposed on the object-side surface S3 of the first lens L1.

In some embodiments, the optical imaging device 10 also includes an optical filter L6. The optical filter L6 includes an object-side surface S13 and an image-side surface S14. The optical filter L6 is arranged on the image-side surface S12 of the fifth lens L5. The optical filter L6 can filter visible rays and only allow infrared rays to pass through, so that the optical imaging device 10 can also be used in a dark environment.

It is to be understood, in other embodiments, the optical filter L6 can filter out infrared rays and only allow visible rays to pass through, so that the optical imaging device 10 can be used in a bright environment.

In some embodiment, the object-side surface S11 of the fifth lens L5 is concave near the optical axis, the object-side surface S11 of the fifth lens L5 is concave near the circumference, and the image-side surface S12 of the fifth lens 15 is convex near the circumference. Through the arrangement of the contouring of the fifth lens L5, the rear focal length of the optical imaging device 10 is further reduced, so as to shorten the total optical length of the optical imaging device 10.

In some embodiments, the optical imaging device 10 satisfies the following formula (2):

0.3<Imgh/f<0.6 (formula (2)), Imgh is a half of an image height corresponding to the maximum field of view of the optical imaging device 10, and f is an effective focal length of the optical imaging device 10.

When the ratio of Imgh/f is within the above range, the imaging characteristics and imaging quality of the optical imaging device 10 are improved.

In some embodiments, the optical imaging device 10 satisfies the following formula (3):

$$0.4<TL4/f<1 \quad \text{(formula (3))}.$$

When the ratio of TL4/f is within the above range, the rear focal length of the optical imaging device 10 can be reduced, thereby shortening the total optical length of the optical imaging device 10.

In some embodiments, the optical imaging device 10 satisfies the following formula (4):

$$0.2<TL5/f<0.6 \quad \text{(formula (4))}.$$

When the ratio of TL5/f is within the above range, the rear focal length of the optical imaging device 10 can be reduced, thereby shortening the total optical length of the optical imaging device 10.

In some embodiments, the optical imaging device 10 satisfies the following formula (5):

0.7<TL/f<1.7 (formula (5)), TL is a distance from the object-side surface S3 of the first lens L1 to the image plane IMA of the optical imaging device 10 along the optical axis.

When the ratio of TL/f is within the above range, the total optical length of the optical imaging device 10 is reduced, and the optical imaging device 10 can have a small size.

In some embodiments, the optical imaging device 10 satisfies the following formula (6):

1.8<f/EPD<2.8 (formula (6)), EPD is an entrance pupil diameter of the optical imaging device 10.

When the ratio of f/EPD is within the above range, light admitted to the optical imaging device 10 and the F-number of the optical imaging device 10 can be easily controlled, so that the optical imaging device 10 has an excellent power of resolution for nearby objects, the imaging quality of the optical imaging device 10 is improved.

In some embodiments, the optical imaging device 10 satisfies the following formula (7):

$$40°<FOV<60° \quad \text{(formula (7))}.$$

When the value of FOV is within the above range, the optical imaging device 10 can be applied in standard photography, and the imaging quality of the optical imaging device 10 is improved.

First Embodiment

Referring to FIG. 1, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

It can be understood that, in other embodiments, the first lens L1, the second lens L2, the third lens L3, the fourth lens L4, and the fifth lens L5 can be made of glass. At least one of the first lens L1, the second lens L2, the third lens L3, the fourth lens L4, and the fifth lens L5 can also be made of glass, and the remaining can be made of plastic.

The object-side surface S3 of the first lens L1 is convex near the optical axis, and the image-side surface S4 of the first lens L1 is convex near the optical axis. The object-side surface S5 of the second lens L2 is concave near the optical axis, and the image-side surface S6 of the second lens L2 is concave near the optical axis. The object-side surface S7 of the third lens L3 is concave near the optical axis, and the image-side surface S8 of the third lens L3 is concave near the optical axis. The object-side surface S9 of the fourth lens L4 is concave near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is concave near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, and the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 1 shows characteristics of the optical imaging device 10. The reference wavelength of focal length, refractive index, and Abbe number is 558 nm, and the units of radius of curvature, thickness, and semi-diameter are in millimeters (mm).

f is the effective focal length of the optical imaging device 10, FNO is the F-number of the optical imaging device 10, FOV is the maximum field of view of the optical imaging device 10, TL is the distance from the object-side surface S3 of the first lens L1 to the image plane IMA of the optical imaging device 10 along the optical axis, TL2 is the distance from the object-side surface S5 of the second lens L2 to the image plane IMA of the optical imaging device 10 along the optical axis, TL3 is the distance from the object-side surface S7 of the third lens L3 to the image plane IMA of the optical imaging device 10 along the optical axis, TL4 is the distance from the object-side surface S9 of the fourth lens L4 to the image plane IMA of the optical imaging device 10 along the optical axis, and TL5 is the distance from the object-side surface S11 of the fifth lens L5 to the image plane IMA of the optical imaging device 10 along the optical axis.

The surface of each of the first lens L1, the second lens L2, the third lens L3, the fourth lens L4, and the fifth lens L5 is aspherical. The contouring Z of each aspherical surface can be, but is not limited to, defined by an aspherical equation which satisfies the following formula (8):

$$Z = \frac{cr^2}{1 + \sqrt{1 - (k+1)c^2 r^2}} + \sum A_i r^i. \quad \text{(formula (8))}$$

Z is a distance between any point on an aspheric surface and a vertex of the aspheric surface along the optical axis, r is a vertical distance from any point on the aspheric surface to the optical axis, c is curvature (reciprocal of the radius of curvature) of the vertex, k is a conic constant, and Ai is a correction coefficient of i-th order of the aspheric surface. For simplicity, these definitions apply to all embodiments. Table 2 shows the conic constant k and the high-order coefficients A4, A6, A8, A10, A12, A14, A16, A18, and A20 for the surfaces S3 to S12 of each aspheric lens in the first embodiment.

TABLE 1

First embodiment
f = 10.617 mm, FNO = 2.771, FOV = 40.676°, TL = 10.827 mm,
TL2 = 9.274 mm, TL3 = 8.349 mm, TL4 = 6.773 mm, TL5 = 3.994 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.254 |
| S2 | | standard surface | infinite | 0.000 | | | | 2.254 |
| STO | | standard surface | infinite | −0.500 | | | | 1.920 |
| S3 | first lens | aspheric surface | 0.336 | 1.357 | plastic | 1.53 | 55.6 | 2.001 |
| S4 | | aspheric surface | 0.001 | 0.196 | | | | 1.973 |
| S5 | second | aspheric surface | −0.012 | 0.492 | plastic | 1.67 | 19.2 | 1.962 |
| S6 | lens | aspheric surface | 0.080 | 0.433 | | | | 1.931 |
| S7 | third lens | aspheric surface | −0.002 | 1.283 | plastic | 1.67 | 19.2 | 1.801 |
| S8 | | aspheric surface | 0.005 | 0.294 | | | | 1.803 |
| S9 | fourth lens | aspheric surface | −0.005 | 1.712 | plastic | 1.53 | 55.6 | 1.853 |
| S10 | | aspheric surface | −0.047 | 0.708 | | | | 2.156 |
| S11 | fifth lens | aspheric surface | −0.124 | 2.187 | plastic | 1.53 | 55.6 | 2.134 |
| S12 | | aspheric surface | 0.071 | 1.807 | | | | 3.182 |
| S13 | optical | standard surface | infinite | 0.210 | glass | 1.52 | 64.2 | 3.810 |
| S14 | filter | standard surface | infinite | 0.500 | | | | 3.869 |
| IMA | | standard surface | infinite | 0.000 | | | | 3.937 |

TABLE 2

| surface | k | A4 | A6 | A8 | A10 | A12 | A14 | A16 | A18 | A20 |
|---|---|---|---|---|---|---|---|---|---|---|
| S3 | 4.078E−01 | −2.379E−033 | −3.313E−04 | −9.765E−05 | −7.851E−06 | 5.632E−07 | 1.260E−07 | −2.091E−07 | 0.000E+00 | 0.000E+00 |
| S4 | 1.001E+02 | −1.221E−03 | −6.975E−04 | 7.804E−05 | −1.486E−05 | −3.637E−06 | 4.445E−07 | 5.565E−07 | 0.000E+00 | 0.000E+00 |
| S5 | −1.000E+02 | −5.061E−03 | 5.005E−04 | −1.874E−04 | −1.392E−06 | 4.795E−08 | 1.336E−06 | 4.997E−07 | 0.000E+00 | 0.000E+00 |
| S6 | −1.220E+02 | −5.074E−03 | −1.456E−03 | −2.354E−04 | −1.822E−05 | 2.257E−07 | 4.910E−07 | 5.398E−07 | 0.000E+00 | 0.000E+00 |
| S7 | 7.059E+01 | −1.400E−02 | −2.967E−04 | −8.903E−05 | −7.807E−05 | −5.336E−06 | 3.398E−07 | 1.020E−06 | 0.000E+00 | 0.000E+00 |
| S8 | 1.001E+02 | −5.857E−03 | 2.173E−03 | 4.705E−04 | −1.882E−05 | 1.993E−06 | 3.531E−06 | 1.122E−06 | 0.000E+00 | 0.000E+00 |
| S9 | 2.935E+01 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 7.997E+01 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 6.406E+00 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −6.451E+00 | 0.000E+00 | 0.000E+00 | 0.000E+00 | 0.000E+00 | 0.000E+00 | 0.000E+00 | 0.000E+00 | 0.000E+00 | 0.000E+00 |

Figure 2:
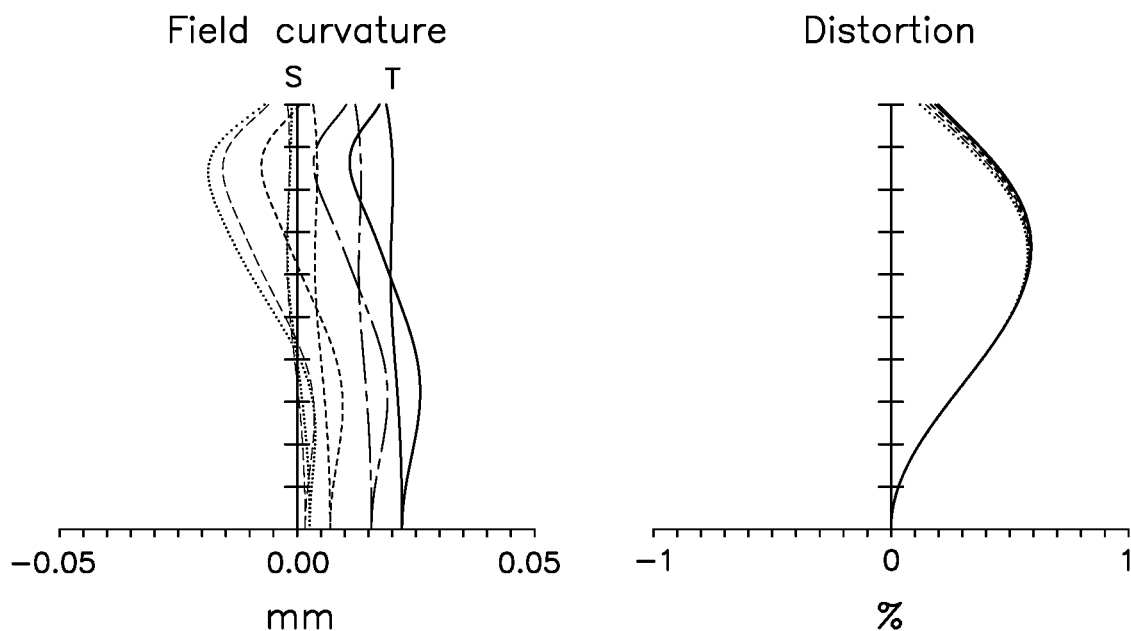
FIG. 2 is a diagram of field curvatures and distortions of the optical imaging device in the first embodiment.

FIG. 2 shows field curvature curves and distortion curves of the optical imaging device 10 of the first embodiment, the field curvature curves represent the meridian field curvature and the sagittal field curvature, in which the maximum value of each of the sagittal field curve and the meridional field curve is less than 0.025 mm, indicating that good compensation is obtained. The distortion curves represent distortion values corresponding to different field angles, in which the maximum distortion is less than 0.6%, indicating that distortion has been corrected. As can be seen from FIG. 2, the optical imaging device 10 in the first embodiment has a good imaging quality.

Second Embodiment

Figure 3:
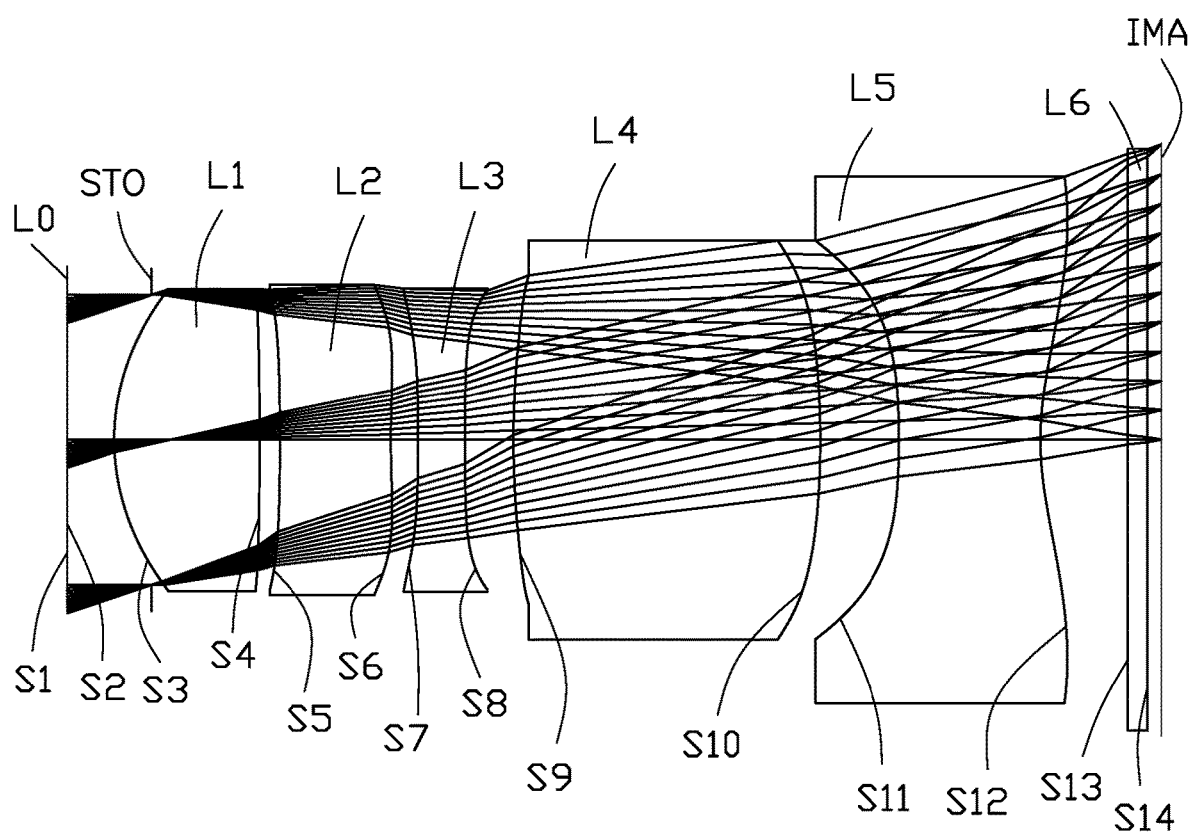
FIG. 3 is a diagrammatic view of a second embodiment of an optical imaging device according to the present disclosure.

Referring to FIG. 3, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

The object-side surface S3 of the first lens L1 is convex near the optical axis, and the image-side surface S4 of the first lens L1 is convex near the optical axis. The object-side surface S5 of the second lens L2 is concave near the optical axis, and the image-side surface S6 of the second lens L2 is concave near the optical axis. The object-side surface S7 of the third lens L3 is concave near the optical axis, and the image-side surface S8 of the third lens L3 is concave near the optical axis. The object-side surface S9 of the fourth lens L4 is convex near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is convex near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 3 shows characteristics of the optical imaging device 10. The reference wavelength of focal length, refractive index, and Abbe number is 558 nm, and the units of radius of curvature, thickness, and semi-diameter are in millimeters (mm).

TABLE 3

Second embodiment
f = 9.341 mm, FNO = 2.423, FOV = 45.016°,
TL = 11.703 mm, TL2 = 9.424 mm, TL3 = 7.943 mm, TL4 = 6.926 mm, TL5 = 2.802 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.303 |
| S2 | | standard surface | infinite | 0.000 | | | | 2.303 |
| STO | | standard surface | infinite | 0.900 | | | | 1.930 |
| S3 | first lens | aspheric surface | 0.268 | 1.552 | plastic | 1.53 | 55.6 | 2.003 |
| S4 | | aspheric surface | 0.015 | 0.216 | | | | 2.010 |
| S5 | second | aspheric surface | −0.019 | 1.190 | plastic | 1.67 | 19.2 | 2.005 |
| S6 | lens | aspheric surface | 0.063 | 0.291 | | | | 2.067 |
| S7 | third lens | aspheric surface | −0.019 | 0.500 | plastic | 1.67 | 19.2 | 2.020 |
| S8 | | aspheric surface | 0.011 | 0.517 | | | | 1.993 |

TABLE 3-continued

Second embodiment
f = 9.341 mm, FNO = 2.423, FOV = 45.016°,
TL = 11.703 mm, TL2 = 9.424 mm, TL3 = 7.943 mm, TL4 = 6.926 mm, TL5 = 2.802 mm

| Surface | Lens | Type of surface | radius of curvature | thickness | material | refractive index | Abbe number | semi-diameter |
|---|---|---|---|---|---|---|---|---|
| S9 | fourth lens | aspheric surface | 0.067 | 3.279 | plastic | 1.53 | 55.6 | 2.195 |
| S10 | | aspheric surface | −0.063 | 0.845 | | | | 2.654 |
| S11 | fifth lens | aspheric surface | −0.068 | 1.509 | plastic | 1.53 | 55.6 | 3.651 |
| S12 | | aspheric surface | 0.200 | 0.933 | | | | 3.502 |
| S13 | optical | standard surface | infinite | 0.210 | glass | 1.52 | 64.2 | 3.810 |
| S14 | filter | standard surface | infinite | 0.150 | | | | 3.869 |
| IMA | | standard surface | infinite | 0.000 | | | | 3.937 |

Table 4 shows the conic constant k and the high-order coefficients A4, A6, A8, A10, A12, A14, A16, A18, and A20 for the surfaces S3 to S12 of each aspheric lens in the second embodiment.

TABLE 4 aspherical coefficients

| surface | k | A4 | A6 | A8 | A10 | A12 | A14 | A16 | A18 | A20 |
|---|---|---|---|---|---|---|---|---|---|---|
| S3 | 5.490E−01 | −1.589E−03 | −1.292E−04 | 4.536E−06 | −1.335E−05 | −3.561E−07 | 1.063E−06 | −1.620E−07 | 0.000E+00 | 0.000E+00 |
| S4 | −1.00E+02 | 9.111E−04 | −1.533E−04 | −1.269E−04 | 1.133E−05 | 5.881E−06 | −2.266E−06 | 2.611E−07 | 0.000E+00 | 0.000E+00 |
| S5 | 1.000E+02 | −2.551E−03 | −1.312E−04 | −1.175E−04 | 1.451E−06 | 4.194E−06 | −2.004E−06 | 3.840E−07 | 0.000E+00 | 0.000E+00 |
| S6 | −1.000E+02 | −1.384E−02 | −1.630E−03 | 6.990E−05 | 5.017E−05 | 2.574E−06 | 2.741E−07 | −1.769E−04 | 0.000E+00 | 0.000E+00 |
| S7 | 1.000E+02 | −1.107E−02 | 5.616E−04 | 3.889E−05 | −9.778E−05 | 4.703E−05 | −2.216E−06 | −5.688E−07 | 0.000E+00 | 0.000E+00 |
| S8 | −1.000E+02 | 4.641E−03 | 2.476E−03 | −2.150E−06 | −6.480E−05 | −1.378E−06 | 9.803E−06 | −1.475E−06 | 0.000E+00 | 0.000E+00 |
| S9 | 2.848E+01 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 2.377E+01 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 2.250E+01 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −1.095E+01 | 0.000E+00 | 0.000E+00 | 0.000E+00 | 0.000E+00 | 0.000E+00 | 0.000E+00 | 0.000E+00 | 0.000E+00 | 0.000E+00 |

Figure 4:
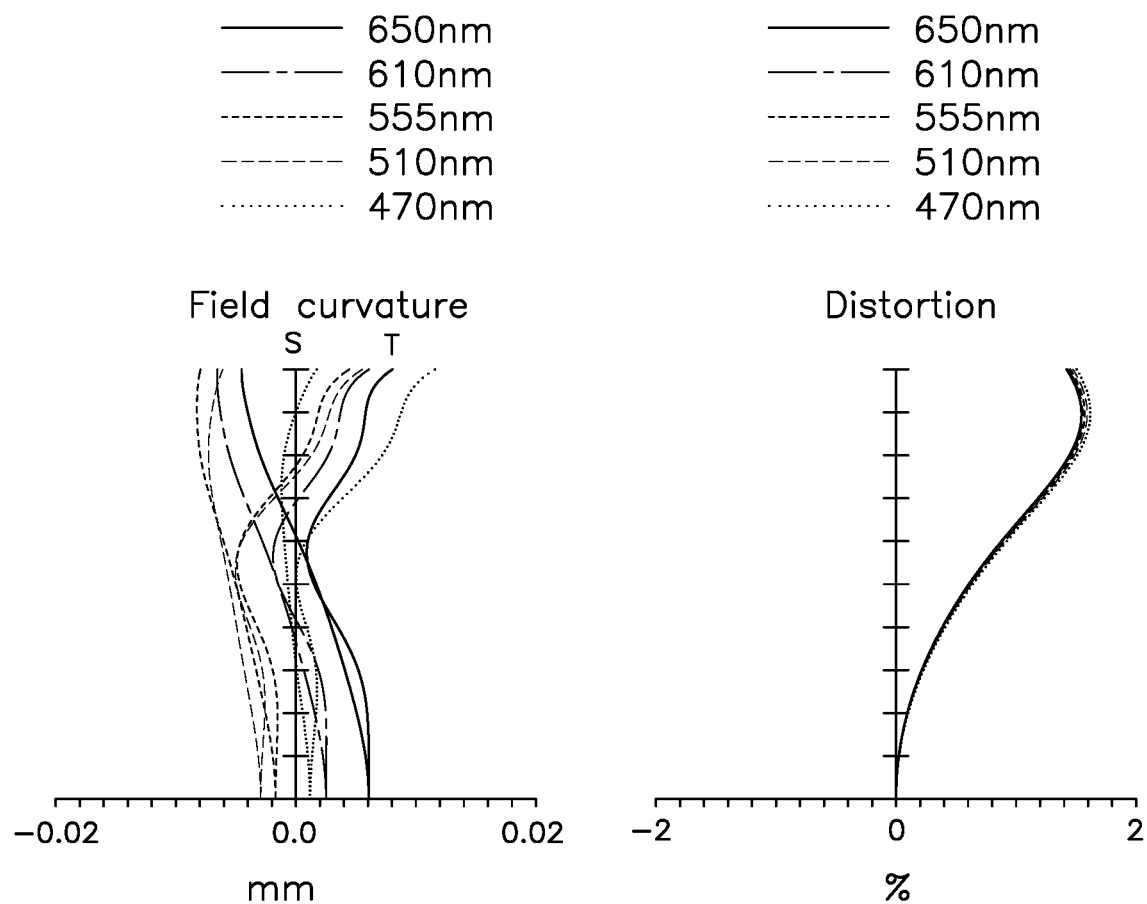
FIG. 4 is a diagram of field curvatures and distortions of the optical imaging device in the second embodiment.

FIG. 4 shows the field curvature curves and the distortion curves of the optical imaging device 10 of the second embodiment, the field curvature curves represent the meridian field curvature and the sagittal field curvature, in which the maximum value of each of the sagittal field curve and the meridional field curve is less than 0.012 mm, indicating that good compensation is obtained. The distortion curves represent the distortion values corresponding to different field angles, in which the maximum distortion is less than 2%, indicating that distortion has been corrected. As can be seen from FIG. 4, the optical imaging device 10 in the second embodiment has a good imaging quality.

Third Embodiment

Figure 5:
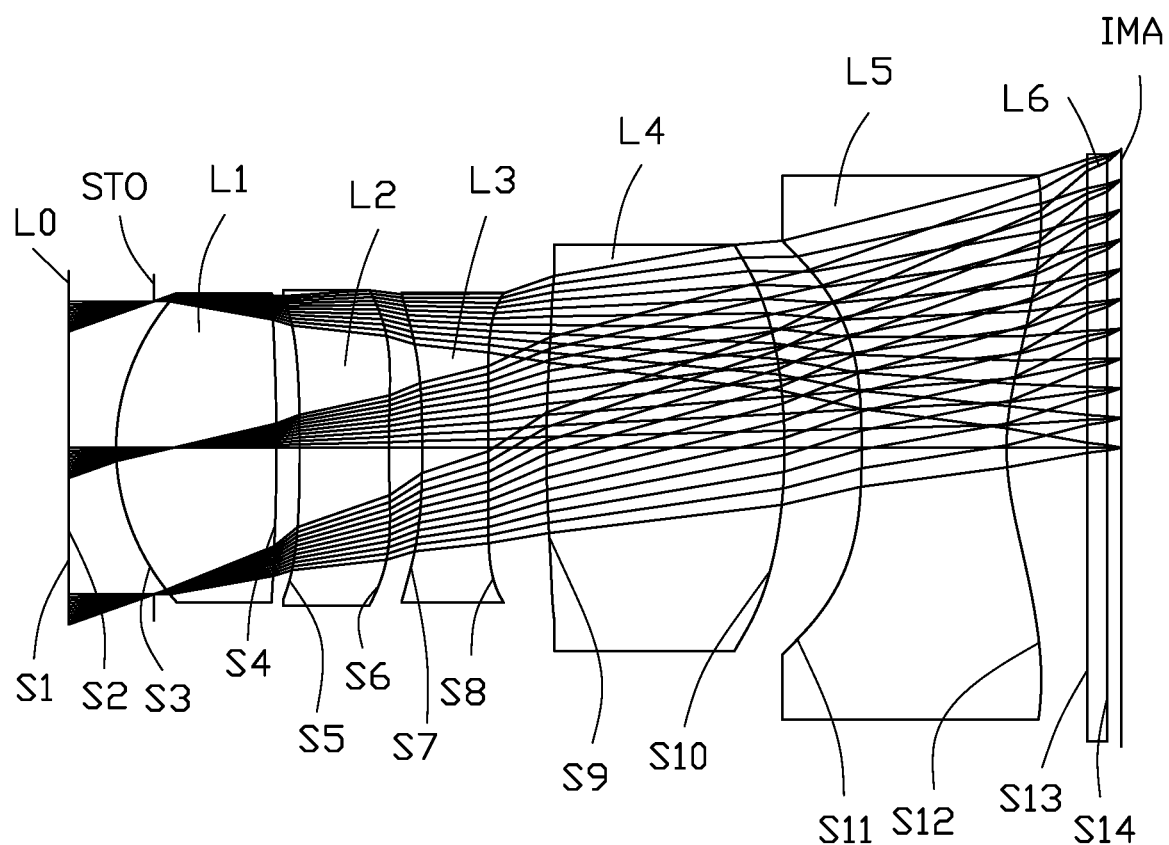
FIG. 5 is a diagrammatic view of a third embodiment of an optical imaging device according to the present disclosure.

Referring to FIG. 5, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

The object-side surface S3 of the first lens L1 is convex near the optical axis, and the image-side surface S4 of the first lens L1 is convex near the optical axis. The object-side surface S5 of the second lens L2 is concave near the optical axis, and the image-side surface S6 of the second lens L2 is concave near the optical axis. The object-side surface S7 of the third lens L3 is concave near the optical axis, and the image-side surface S8 of the third lens L3 is concave near the optical axis. The object-side surface S9 of the fourth lens L4 is convex near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is convex near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 5 shows characteristics of the optical imaging device 10. The reference wavelength of focal length, refractive index, and Abbe number is 558 nm, and the units of radius of curvature, thickness, and semi-diameter are in millimeters (mm).

TABLE 5

Third embodiment
f = 8.795 mm, FNO = 2.279, FOV = 47.578°, TL = 10.639 mm, TL2 = 8.696 mm,
TL3 = 7.399 mm, TL4 = 6.085 mm, TL5 = 2.748 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.327 |
| S2 | | standard surface | infinite | 0.000 | | | | 2.327 |
| STO | | standard surface | infinite | 0.900 | | | | 1.930 |
| S3 | first lens | aspheric surface | 0.278 | 1.698 | plastic | 1.53 | 55.6 | 2.037 |
| S4 | | aspheric surface | −0.031 | 0.245 | | | | 2.009 |
| S5 | second | aspheric surface | −0.029 | 0.943 | plastic | 1.67 | 19.2 | 2.001 |
| S6 | lens | aspheric surface | 0.061 | 0.354 | | | | 2.077 |
| S7 | third lens | aspheric surface | −0.044 | 0.702 | plastic | 1.67 | 19.2 | 2.026 |
| S8 | | aspheric surface | −0.011 | 0.612 | | | | 2.041 |
| S9 | fourth lens | aspheric surface | 0.052 | 2.520 | plastic | 1.53 | 55.6 | 2.270 |
| S10 | | aspheric surface | −0.100 | 0.817 | | | | 2.677 |
| S11 | fifth lens | aspheric surface | −0.054 | 1.534 | plastic | 1.53 | 55.6 | 2.730 |
| S12 | | aspheric surface | 0.240 | 0.854 | | | | 3.584 |
| S13 | optical | standard surface | infinite | 0.210 | glass | 1.52 | 64.2 | 3.811 |
| S14 | filter | standard surface | infinite | 0.150 | | | | 3.869 |
| IMA | | standard surface | infinite | 0.000 | | | | 3.937 |

Table 6 shows the conic constant k and the high-order coefficients A4, A6, A8, A10, A12, A14, A16, A18, and A20 for the surfaces S3 to S12 of each aspheric lens in the third embodiment.

TABLE 6 aspherical coefficients

| surface | k | A4 | A6 | A8 | A10 | A12 | A14 | A16 | A18 | A20 |
|---|---|---|---|---|---|---|---|---|---|---|
| S3 | 5.824E−01 | −1.351E−03 | −1.718E−04 | 4.582E−05 | −1.647E−05 | −9.018E−07 | 1.313E−06 | −1.721E−07 | 0.000E+00 | 0.000E+00 |
| S4 | −1.000E+02 | 1.310E−03 | −1.021E−04 | −1.350E−04 | 2.958E−05 | 7.990E−06 | −4.04E−06 | 4.395E−07 | 0.000E+00 | 0.000E+00 |
| S5 | 1.000E+02 | −4.454E−03 | −4.522E−04 | −5.979E−05 | 3.320E−06 | 3.233E−07 | −1.501E−06 | 3.758E−07 | 0.000E+00 | 0.000E+00 |
| S6 | −1.000E+02 | −1.460E−02 | −1.533E−03 | 6.747E−06 | 5.356E−06 | 5.511E−06 | 1.507E−08 | −2.500E−07 | 0.000E+00 | 0.000E+00 |
| S7 | 1.000E+02 | −1.171E−02 | 6.179E−04 | 1.853E−04 | −8.917E−05 | 4.668E−05 | −3.379E−06 | −5.344E−07 | 0.000E+00 | 0.000E+00 |
| S8 | 1.000E+02 | −1.761E−04 | 2.526E−03 | 7.918E−05 | −4.882E−05 | −5.684E−06 | 8.540E−06 | −1.271E−06 | 0.000E+00 | 0.000E+00 |
| S9 | 6.576E+00 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 1.026E+01 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 3.511E+01 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −8.882E+00 | 0.000E+00 | 0.000E+00 | 0.000E+00 | 0.000E+00 | 0.000E+00 | 0.000E+00 | 0.000E+00 | 0.000E+00 | 0.000E+00 |

Figure 6:
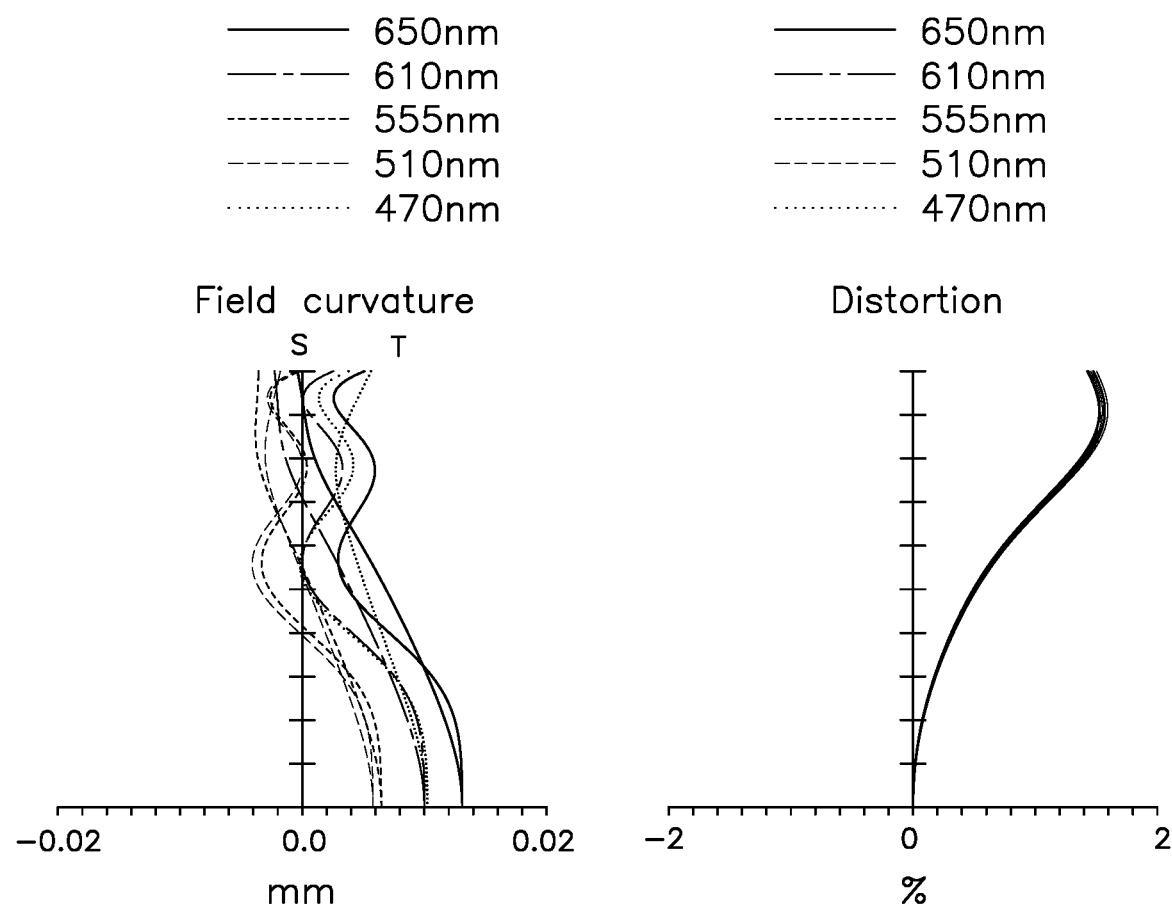
FIG. 6 is a diagram of field curvatures and distortions of the optical imaging device in the third embodiment.

FIG. 6 shows the field curvature curves and the distortion curves of the optical imaging device 10 of the third embodiment, the field curvature curves represent the meridian field curvature and the sagittal field curvature, in which the maximum value of each of the sagittal field curve and the meridional field curve is less than 0.014 mm, indicating that good compensation is obtained. The distortion curves represent the distortion values corresponding to different field angles, in which the maximum distortion is less than 1.6%, indicating that distortion has been corrected. As can be seen from FIG. 6, the optical imaging device 10 in the third embodiment has a good imaging quality.

Fourth Embodiment

Figure 7:
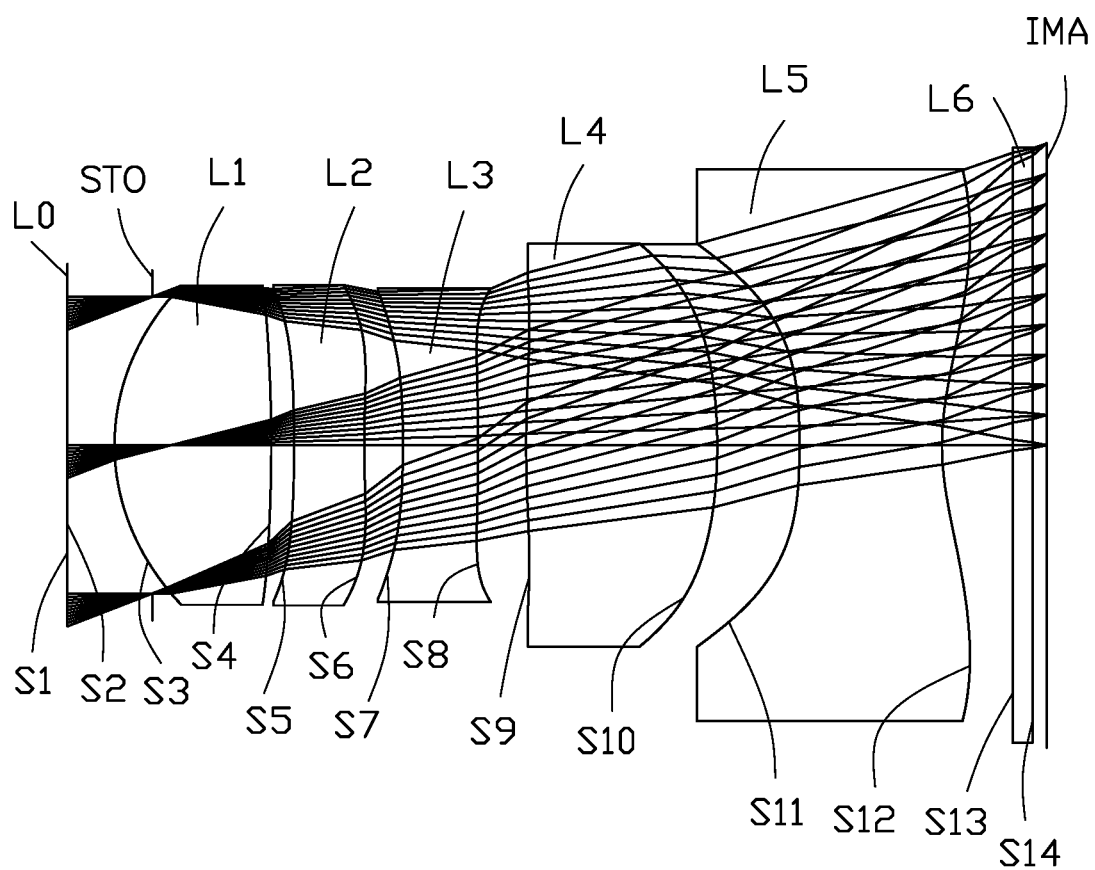
FIG. 7 is a diagrammatic view of a fourth embodiment of an optical imaging device according to the present disclosure.

Referring to FIG. 7, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

The object-side surface S3 of the first lens L1 is convex near the optical axis, and the image-side surface S4 of the first lens L1 is convex near the optical axis. The object-side surface S5 of the second lens L2 is concave near the optical axis, and the image-side surface S6 of the second lens L2 is concave near the optical axis. The object-side surface S7 of the third lens L3 is concave near the optical axis, and the image-side surface S8 of the third lens L3 is convex near the optical axis. The object-side surface S9 of the fourth lens L4 is convex near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is concave near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 7 shows characteristics of the optical imaging device 10. The reference wavelength of focal length, refractive index, and Abbe number is 558 nm, and the units of radius of curvature, thickness, and semi-diameter are in millimeters (mm).

angles, in which the maximum distortion is less than 1.6%, indicating that distortion has been corrected. As can be seen from FIG. 8, the optical imaging device 10 in the fourth embodiment has a good imaging quality.

Fifth Embodiment

Figure 9:
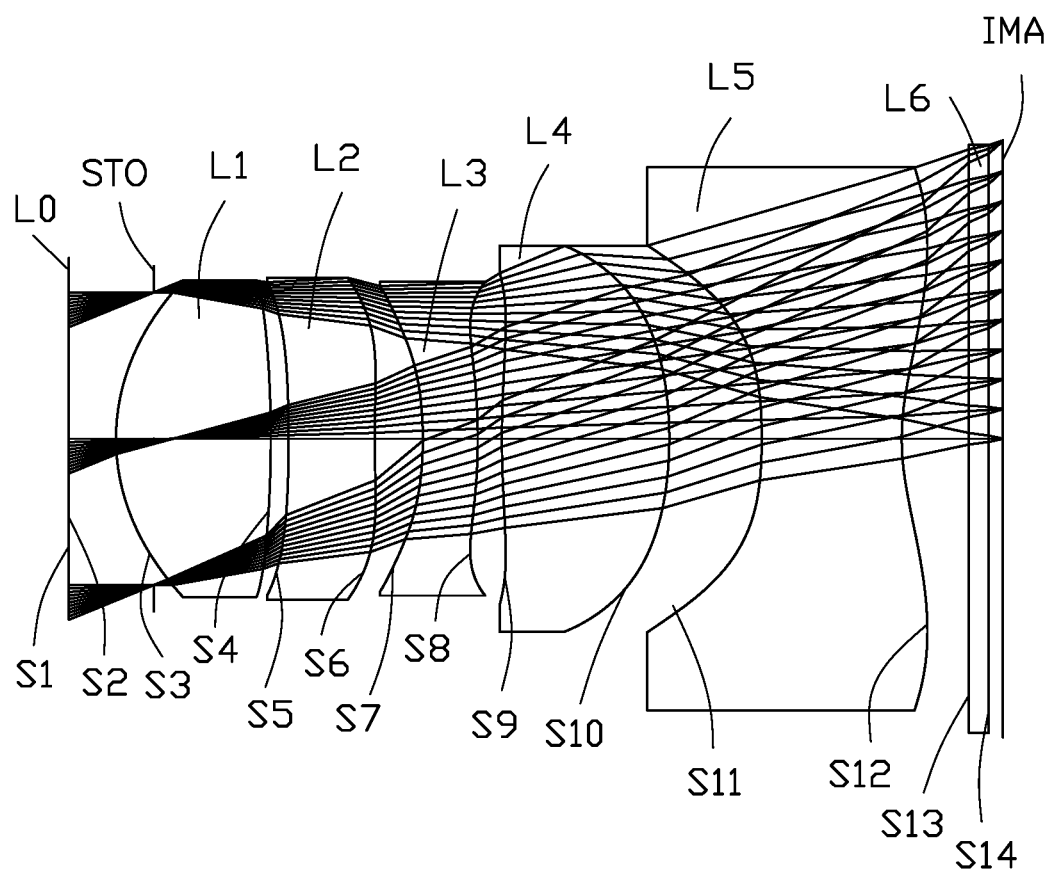
FIG. 9 is a diagrammatic view of a fifth embodiment of an optical imaging device according to the present disclosure.

Referring to FIG. 9, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

TABLE 7

Fourth embodiment
f = 8.194 mm, FNO = 2.122, FOV = 50.670°, TL = 9.895 mm,
TL2 = 7.989 mm, TL3 = 6.834 mm, TL4 = 5.525 mm, TL5 = 2.622 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.356 |
| S2 | | standard surface | infinite | 0.000 | | | | 2.356 |
| STO | | standard surface | infinite | 0.900 | | | | 1.930 |
| S3 | first lens | aspheric surface | 0.294 | 1.664 | plastic | 1.53 | 55.6 | 2.076 |
| S4 | | aspheric surface | −0.041 | 0.242 | | | | 2.046 |
| S5 | second | aspheric surface | −0.037 | 0.744 | plastic | 1.67 | 19.2 | 2.032 |
| S6 | lens | aspheric surface | 0.067 | 0.410 | | | | 2.085 |
| S7 | third lens | aspheric surface | −0.053 | 0.797 | plastic | 1.67 | 19.2 | 2.001 |
| S8 | | aspheric surface | −0.017 | 0.512 | | | | 2.040 |
| S9 | fourth lens | aspheric surface | 0.061 | 2.029 | plastic | 1.53 | 55.6 | 2.256 |
| S10 | | aspheric surface | −0.117 | 0.874 | | | | 2.622 |
| S11 | fifth lens | aspheric surface | −0.088 | 1.512 | plastic | 1.53 | 55.6 | 2.627 |
| S12 | | aspheric surface | 0.242 | 0.750 | | | | 3.589 |
| S13 | optical | standard surface | infinite | 0.210 | glass | 1.52 | 64.2 | 3.814 |
| S14 | filter | standard surface | infinite | 0.150 | | | | 3.871 |
| IMA | | standard surface | infinite | 0.000 | | | | 3.934 |

Table 8 shows the conic constant k and the high-order coefficients A4, A6, A8, A10, A12, A14, A16, A18, and A20 for the surfaces S3 to S12 of each aspheric lens in the fourth embodiment.

The object-side surface S3 of the first lens L1 is convex near the optical axis, and the image-side surface S4 of the first lens L1 is convex near the optical axis. The object-side surface S5 of the second lens L2 is concave near the optical

TABLE 8 aspherical coefficients

| surface | k | A4 | A6 | A8 | A10 | A12 | A14 | A16 | A18 | A20 |
|---|---|---|---|---|---|---|---|---|---|---|
| S3 | 5.122E−01 | −1.641E−03 | −2.735E−04 | 6.270E−05 | −2.278E−05 | −2.079E−06 | 1.914E−06 | −2.586E−07 | 0.000E+00 | 0.000E+00 |
| S4 | −1.390E+01 | 1.011E−03 | 2.309E−06 | −1.889E−04 | 1.066E−05 | −4.785E−06 | 4.932E−07 | 0.000E+00 | 0.000E+00 | |
| S5 | 7.512E+01 | −6.254E−03 | −1.748E−04 | −3.958E−05 | −1.877E−05 | −1.939E−07 | 9.981E−07 | 1.245E−08 | 0.000E+00 | 0.000E+00 |
| S6 | −9.312E+01 | −1.547E−02 | −1.508E−03 | 2.782E−05 | 5.547E−05 | 4.675E−06 | −5.240E−07 | −1.986E−07 | 0.000E+00 | 0.000E+00 |
| S7 | 7.974E+01 | −1.390E−02 | 4.781E−04 | 3.919E−04 | −5.757E−05 | 3.734E−05 | −7.676E−06 | 2.381E−07 | 0.000E+00 | 0.000E+00 |
| S8 | −7.387E+01 | −5.278E−03 | 3.232E−03 | 2.145E−04 | −3.769E−05 | −1.021E−05 | 7.591E−06 | −1.094E−06 | 0.000E+00 | 0.000E+00 |
| S9 | −7.595E+01 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 7.627E+00 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 1.306E+01 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −1.036E+01 | 0.000E+00 | 0.000E+00 | 0.000E+00 | 0.000E+00 | 0.000E+00 | 0.000E+00 | 0.000E+00 | 0.000E+00 | 0.000E+00 |

Figure 8:
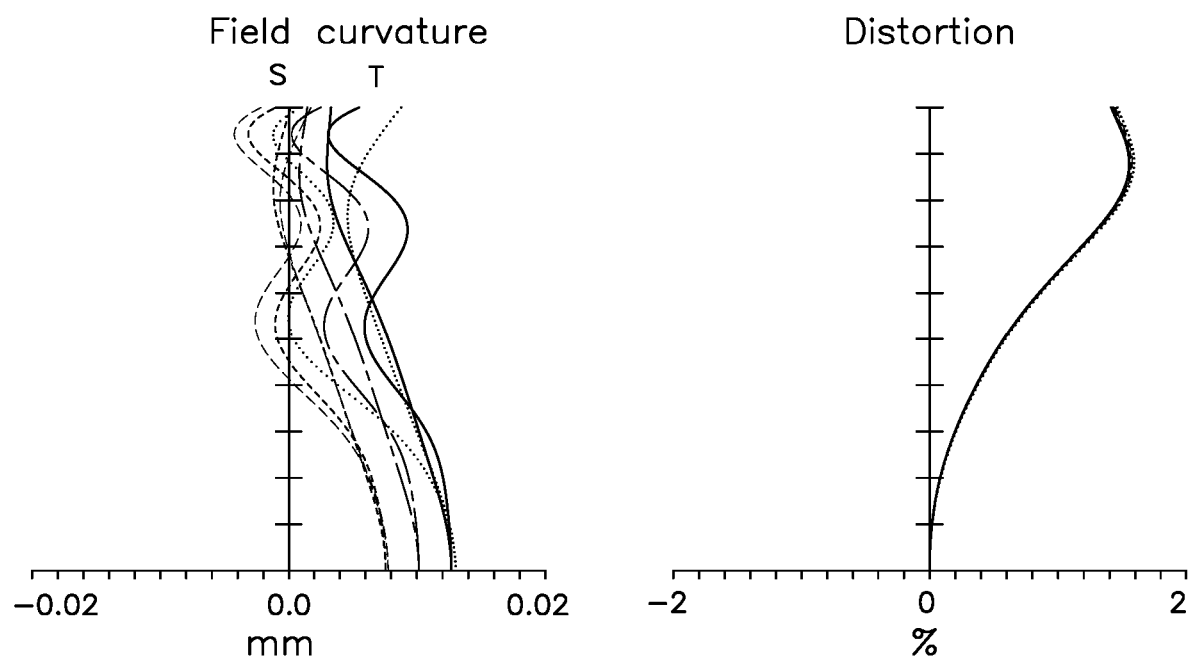
FIG. 8 is a diagram of field curvatures and distortions of the optical imaging device in the fourth embodiment.

FIG. 8 shows the field curvature curves and the distortion curves of the optical imaging device 10 of the fourth embodiment, the field curvature curves represent the meridian field curvature and the sagittal field curvature, in which the maximum value of each of the sagittal field curve and the meridional field curve is less than 0.014 mm, indicating that good compensation is obtained. The distortion curves represent the distortion values corresponding to different field axis, and the image-side surface S6 of the second lens L2 is concave near the optical axis. The object-side surface S7 of the third lens L3 is concave near the optical axis, and the image-side surface S8 of the third lens L3 is convex near the optical axis. The object-side surface S9 of the fourth lens L4 is convex near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is concave near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 9 shows characteristics of the optical imaging device 10. The reference wavelength of focal length, refractive index, and Abbe number is 558 nm, and the units of radius of curvature, thickness, and semi-diameter are in millimeters (mm).

TABLE 9

Fifth embodiment
f = 7.640 mm, FNO = 1.979, FOV = 53.866°, TL = 9.400 mm,
TL2 = 7.572 mm, TL3 = 6.148 mm, TL4 = 5.310 mm, TL5 = 2.556 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.387 |
| S2 | | standard surface | infinite | 0.000 | | | | 2.387 |
| STO | | standard surface | infinite | 0.900 | | | | 1.930 |
| S3 | first lens | aspheric surface | 0.298 | 1.640 | plastic | 1.53 | 55.6 | 2.087 |
| S4 | | aspheric surface | −0.048 | 0.188 | | | | 2.085 |
| S5 | second | aspheric surface | −0.035 | 0.914 | plastic | 1.67 | 19.2 | 2.065 |
| S6 | lens | aspheric surface | 0.055 | 0.510 | | | | 2.123 |
| S7 | third lens | aspheric surface | −0.159 | 0.582 | plastic | 1.67 | 19.2 | 2.018 |
| S8 | | aspheric surface | −0.096 | 0.256 | | | | 2.069 |
| S9 | fourth lens | aspheric surface | 0.069 | 1.774 | plastic | 1.53 | 55.6 | 2.189 |
| S10 | | aspheric surface | −0.156 | 0.980 | | | | 2.548 |
| S11 | fifth lens | aspheric surface | −0.111 | 1.483 | plastic | 1.53 | 55.6 | 2.555 |
| S12 | | aspheric surface | 0.256 | 0.713 | | | | 3.583 |
| S13 | optical | standard surface | infinite | 0.210 | glass | 1.52 | 64.2 | 3.824 |
| S14 | filter | standard surface | infinite | 0.150 | | | | 3.879 |
| IMA | | standard surface | infinite | 0.000 | | | | 3.942 |

Table 10 shows the conic constant k and the high-order coefficients A4, A6, A8, A10, A12, A14, A16, A18, and A20 for the surfaces S3 to S12 of each aspheric lens in the fifth embodiment.

TABLE 10 aspherical coefficients

| surface | k | A4 | A6 | A8 | A10 | A12 | A14 | A16 | A18 | A20 |
|---|---|---|---|---|---|---|---|---|---|---|
| S3 | 5.887E−01 | −2.217E−03 | −4.392E−04 | 1.005E−04 | −3.843E−05 | −2.321E−06 | 2.612E−06 | −3.846E−07 | 0.000E+00 | 0.000E+00 |
| S4 | 7.588E+01 | −1.149E−03 | 9.326E−04 | −9.031E−05 | −5.390E−05 | 4.054E−08 | 5.445E−06 | −8.496E−07 | 0.000E+00 | 0.000E+00 |
| S5 | 1.000E+02 | −8.687E−03 | 1.188E−03 | −7.470E−05 | −1.022E−04 | 1.895E−06 | 8.498E−06 | −1.219E−06 | 0.000E+00 | 0.000E+00 |
| S6 | −8.543E+01 | −1.845E−02 | −1.030E−03 | −1.783E−04 | 6.149E−05 | 5.206E−05 | −1.572E−05 | 1.168E−06 | 0.000E+00 | 0.000E+00 |
| S7 | 7.286E+00 | −1.374E−02 | 3.121E−04 | 1.357E−03 | −3.371E−05 | −8.808E−07 | −1.649E−05 | 2.620E−06 | 0.000E+00 | 0.000E+00 |
| S8 | 2.117E+01 | −3.732E−03 | 4.914E−03 | 2.485E−04 | 1.325E−04 | −5.006E−05 | 1.059E−06 | 6.259E−07 | 0.000E+00 | 0.000E+00 |
| S9 | −5.450E+01 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 4.765E+00 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 4.668E+00 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −1.024E+01 | 0.000E+00 | 0.000E+00 | 0.000E+00 | 0.000E+00 | 0.000E+00 | 0.000E+00 | 0.000E+00 | 0.000E+00 | 0.000E+00 |

Figure 10:
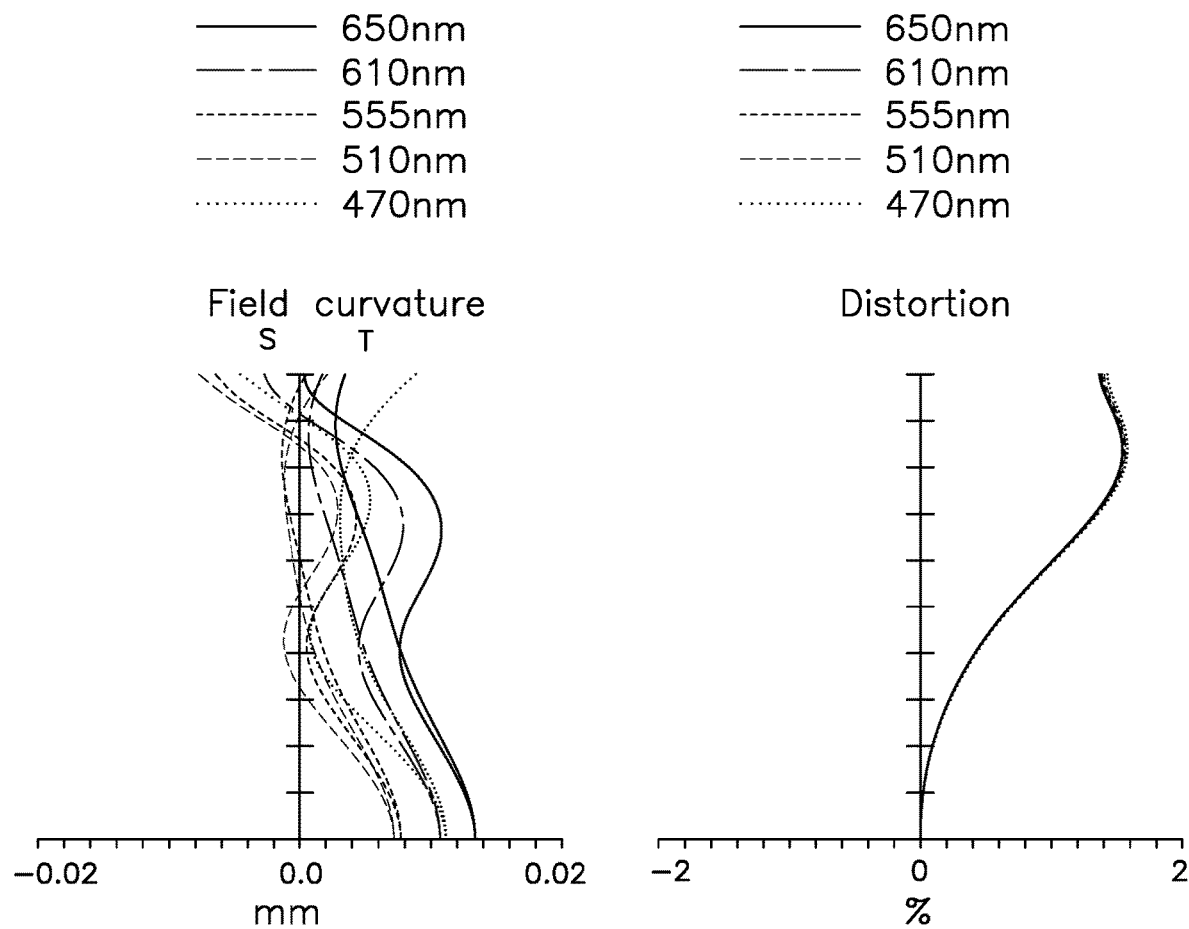
FIG. 10 is a diagram of field curvatures and distortions of the optical imaging device in the fifth embodiment.

FIG. 10 shows the field curvature curves and the distortion curves of the optical imaging device 10 of the fifth embodiment, the field curvature curves represent the meridian field curvature and the sagittal field curvature, in which the maximum value of each of the sagittal field curve and the meridional field curve is less than 0.014 mm, indicating that good compensation is obtained. The distortion curves represent the distortion values corresponding to different field angles, in which the maximum distortion is less than 1.6%, indicating that distortion has been corrected. As can be seen from FIG. 10, the optical imaging device 10 in the fifth embodiment has a good imaging quality.

Sixth Embodiment

Figure 11:
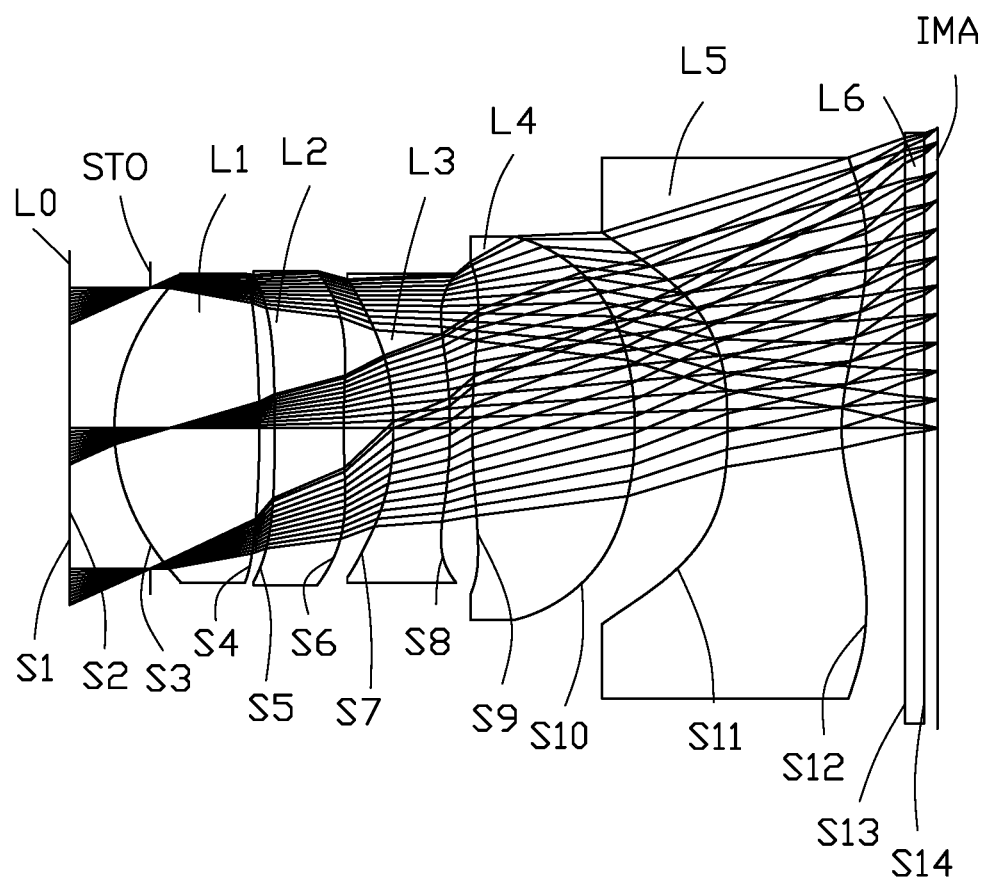
FIG. 11 is a diagrammatic view of a sixth embodiment of an optical imaging device according to the present disclosure.

Referring to FIG. 11, the optical imaging device 10 includes, from the object side to the image side, a stop STO, a first lens L1 with a refractive power, a second lens L2 with a refractive power, a third lens L3 with a refractive power, a fourth lens L4 with a negative refractive power, a fifth lens L5 with a negative refractive power, and an optical filter L6.

The first lens L1, the second lens L2, the third lens L3, the fourth lens L4, and the fifth lens L5 are made of plastic, and the optical filter L6 is made of glass.

The object-side surface S3 of the first lens L1 is convex near the optical axis, and the image-side surface S4 of the first lens L1 is convex near the optical axis. The object-side surface S5 of the second lens L2 is concave near the optical axis, and the image-side surface S6 of the second lens L2 is concave near the optical axis. The object-side surface S7 of the third lens L3 is concave near the optical axis, and the image-side surface S8 of the third lens L3 is convex near the optical axis. The object-side surface S9 of the fourth lens L4 is convex near the optical axis, and the image-side surface S10 of the fourth lens L4 is convex near the optical axis. The object-side surface S11 of the fifth lens L5 is concave near the optical axis, and the image-side surface S12 of the fifth lens L5 is concave near the optical axis.

The object-side surface S3 of the first lens L1 is convex near the circumference, and the image-side surface S4 of the first lens L1 is convex near the circumference. The object-side surface S5 of the second lens L2 is concave near the circumference, and the image-side surface S6 of the second lens L2 is convex near the circumference. The object-side surface S7 of the third lens L3 is concave near the circumference, and the image-side surface S8 of the third lens L3 is concave near the circumference. The object-side surface S9 of the fourth lens L4 is concave near the circumference, and the image-side surface S10 of the fourth lens L4 is convex near the circumference. The object-side surface S11 of the fifth lens L5 is concave near the circumference, and the image-side surface S12 of the fifth lens L5 is convex near the circumference.

A dispersion coefficient of the first lens L1 is 55.584, the dispersion coefficient of the second lens L2 is 19.238, the dispersion coefficient of the third lens L3 is 19.238, the dispersion coefficient of the fourth lens L4 is 55.584, the dispersion coefficient of the fifth lens L5 is 55.584.

When the optical imaging device 10 is used, rays from the object side enter the optical imaging device 10, successively pass through the stop STO, the first lens L1, the second lens L2, the third lens L3, the fourth lens L4, the fifth lens L5, and the optical filter L6, and finally converge on the image plane IMA.

Table 11 shows characteristics of the optical imaging device 10. The reference wavelength of focal length, refractive index, and Abbe number is 558 nm, and the units of radius of curvature, thickness, and semi-diameter are in millimeters (mm).

TABLE 11

Sixth embodiment
f = 7.311 mm, FNO = 1.894, FOV = 58.284°, TL = 9.149 mm,
TL2 = 7.368 mm, TL3 = 6.047 mm, TL4 = 5.171 mm, TL5 = 2.334 mm

| Surface | Lens | Type of surface | radius of curvature | thickness | material | refractive index | Abbe number | semi-diameter |
|---|---|---|---|---|---|---|---|---|
| object-side surface | | standard surface | infinite | infinite | | | | 0.000 |
| S1 | | standard surface | infinite | 0.000 | | | | 2.432 |
| S2 | | standard surface | infinite | 0.000 | | | | 2.432 |
| STO | | standard surface | infinite | 0.900 | | | | 1.930 |
| S3 | first lens | aspheric surface | 0.280 | 1.611 | plastic | 1.53 | 55.6 | 2.117 |
| S4 | | aspheric surface | −0.046 | 0.170 | | | | 2.127 |
| S5 | second | aspheric surface | −0.017 | 0.768 | plastic | 1.67 | 19.2 | 2.109 |
| S6 | lens | aspheric surface | 0.073 | 0.553 | | | | 2.162 |
| S7 | third lens | aspheric surface | −0.180 | 0.627 | plastic | 1.67 | 19.2 | 2.052 |
| S8 | | aspheric surface | −0.104 | 0.249 | | | | 2.123 |
| S9 | fourth lens | aspheric surface | 0.091 | 1.808 | plastic | 1.53 | 55.6 | 2.289 |
| S10 | | aspheric surface | −0.168 | 1.029 | | | | 2.638 |
| S11 | fifth lens | aspheric surface | −0.097 | 1.269 | plastic | 1.53 | 55.6 | 2.694 |
| S12 | | aspheric surface | 0.283 | 0.705 | | | | 3.722 |
| S13 | optical | standard surface | infinite | 0.210 | glass | 1.52 | 64.2 | 4.001 |
| S14 | filter | standard surface | infinite | 0.150 | | | | 4.059 |
| IMA | | standard surface | infinite | 0.000 | | | | 4.135 |

Table 12 shows the conic constant k and the high-order coefficients A4, A6, A8, A10, A12, A14, A16, A18, and A20 for the surfaces S3 to S12 of each aspheric lens in the sixth embodiment.

TABLE 12

| | | | | | aspherical coefficients | | | | | |
|---|---|---|---|---|---|---|---|---|---|---|
| surface | k | A4 | A6 | A8 | A10 | A12 | A14 | A16 | A18 | A20 |
| S3 | 5.597E−01 | −2.099E−03 | −4.631E−04 | 1.235E−04 | −4.569E−05 | −2.676E−06 | 3.187E−06 | −4.691E−07 | 0.000E+00 | 0.000E+00 |
| S4 | 5.805E+01 | −1.171E−03 | 8.058E−04 | −1.035E−04 | −5.281E−05 | −6.679E−07 | 5.392E−06 | −8.289E−07 | 0.000E+00 | 0.000E+00 |
| S5 | 1.000E+02 | −1.037E−02 | 1.049E−03 | −6.395E−05 | −9.965E−05 | −7.419E−07 | 8.192E−06 | −1.043E−06 | 0.000E+00 | 0.000E+00 |
| S6 | −4.722E+01 | −1.806E−02 | −1.133E−03 | −2.876E−04 | 5.196E−05 | −1.593E−05 | 1.141E−06 | 0.000E+00 | 0.000E+00 | 0.000E+00 |
| S7 | 5.393E+00 | −1.185E−02 | −2.947E−04 | 1.383E−03 | −1.720E−05 | 2.881E−07 | −1.710E−05 | 2.697E−06 | 0.000E+00 | 0.000E+00 |
| S8 | 1.755E+01 | −5.359E−03 | 4.745E−03 | 2.674E−04 | 1.636E−04 | −5.328E−05 | −5.397E−08 | 7.922E−07 | 0.000E+00 | 0.000E+00 |
| S9 | −2.681E+01 | 0.000E+00 | 0.000E+00 | 0.000E+00 | 0.000E+00 | 0.000E+00 | 0.000E+00 | 0.000E+00 | 0.000E+00 | 0.000E+00 |
| S10 | 3.924E+00 | 0.000E+00 | 0.000E+00 | 0.000E+00 | 0.000E+00 | 0.000E+00 | 0.000E+00 | 0.000E+00 | 0.000E+00 | 0.000E+00 |
| S11 | 7.302E+00 | 0.000E+00 | 0.000E+00 | 0.000E+00 | 0.000E+00 | 0.000E+00 | 0.000E+00 | 0.000E+00 | 0.000E+00 | 0.000E+00 |
| S12 | −9.430E+00 | 0.000E+00 | 0.000E+00 | 0.000E+00 | 0.000E+00 | 0.000E+00 | 0.000E+00 | 0.000E+00 | 0.000E+00 | 0.000E+00 |

Figure 12:
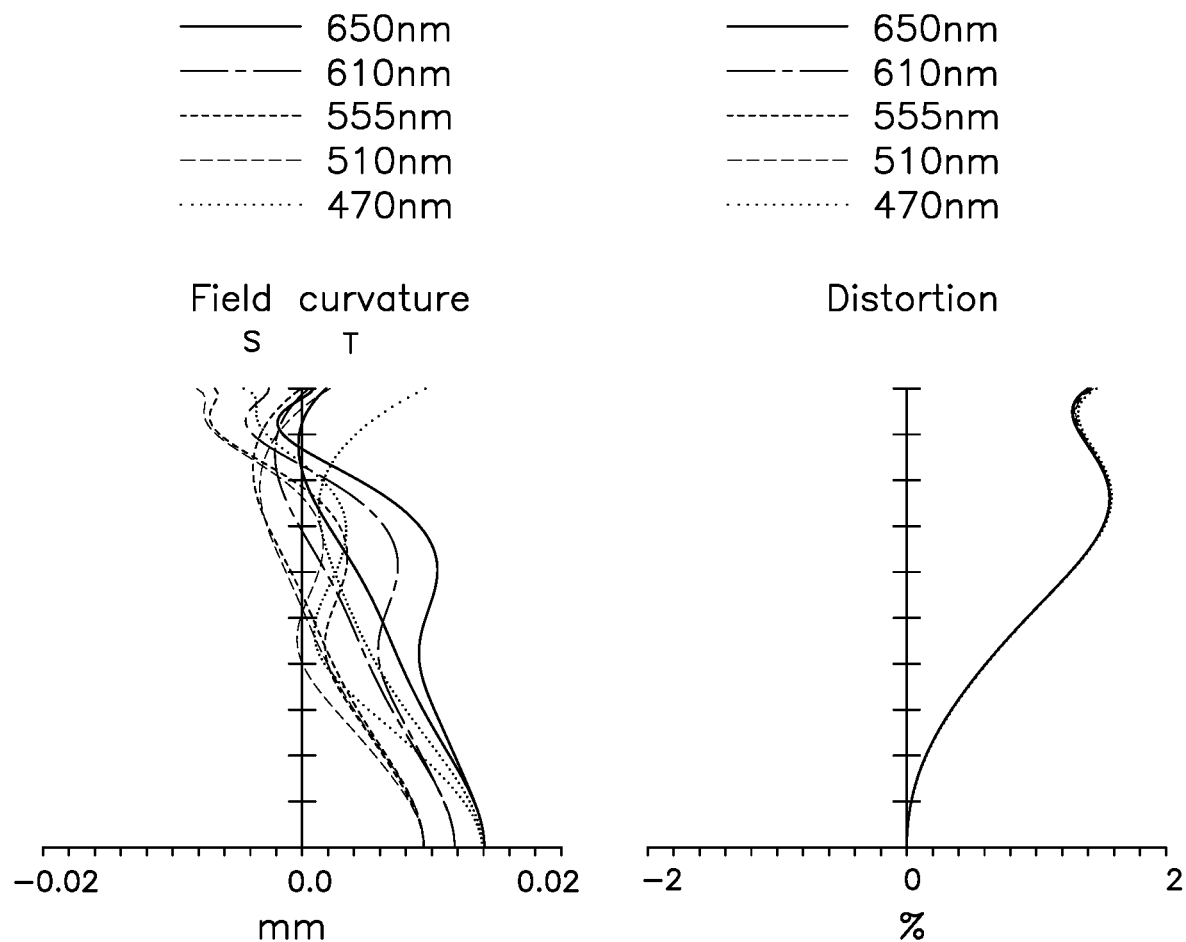
FIG. 12 is a diagram of field curvatures and distortions of the optical imaging device in the sixth embodiment.

FIG. 12 shows the field curvature curves and the distortion curves of the optical imaging device 10 of the sixth embodiment, the field curvature curves represent the meridian field curvature and the sagittal field curvature, in which the maximum value of each of the sagittal field curve and the meridional field curve is less than 0.014 mm, indicating that good compensation is obtained. The distortion curves represent the distortion values corresponding to different field angles, in which the maximum distortion is less than 1.6%, indicating that the distortion has been corrected. As can be seen from FIG. 12, the optical imaging device 10 in the sixth embodiment has a good imaging quality.

Table 13 shows values of TL5/FOV (mm/°), TL4/FNO (mm), Imgh/f, TL4/f, TL5/f, TL/f, f/EPD, and FOV (°) of the optical imaging device 10 in the first to sixth embodiments.

TABLE 13

| | First embodiment | Second embodiment | Third embodiment | Fourth embodiment | Fifth embodiment | Sixth embodiment |
|---|---|---|---|---|---|---|
| TL5/FOV (mm/°) | 0.098 | 0.062 | 0.058 | 0.052 | 0.047 | 0.040 |
| TL4/FNO (mm) | 2.444 | 2.858 | 2.670 | 2.604 | 2.683 | 2.730 |
| Imgh/f | 0.370 | 0.421 | 0.447 | 0.479 | 0.514 | 0.537 |
| TL4/f | 0.638 | 0.741 | 0.692 | 0.674 | 0.695 | 0.707 |
| TL5/f | 0.376 | 0.300 | 0.312 | 0.320 | 0.335 | 0.319 |
| TL/f | 1.020 | 1.253 | 1.210 | 1.208 | 1.230 | 1.251 |
| f/EPD | 2.765 | 2.420 | 2.278 | 2.123 | 1.979 | 1.894 |
| FOV (°) | 40.676 | 45.016 | 47.578 | 50.670 | 53.866 | 58.284 |

Figure 13:
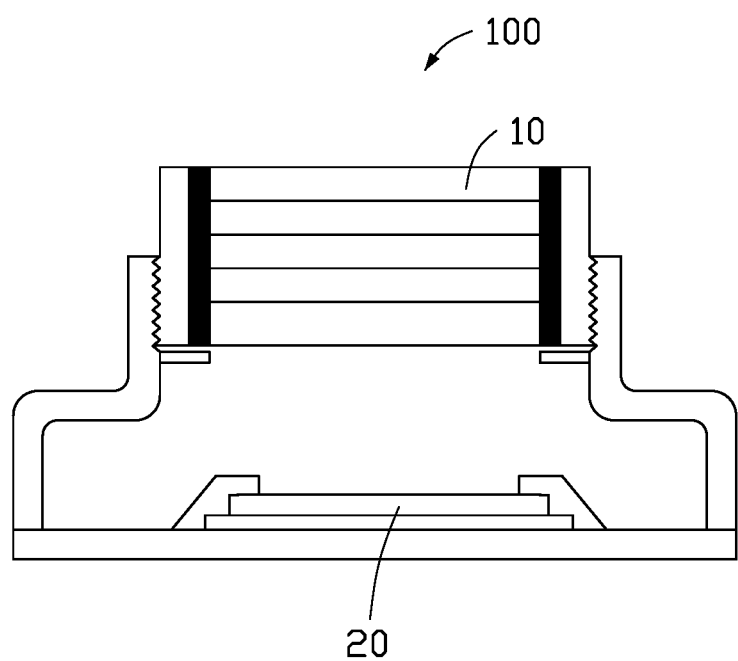
FIG. 13 is a diagrammatic view of an embodiment of an imaging module according to the present disclosure.

Referring to FIG. 13, an embodiment of an imaging module 100 is further provided, which includes the optical imaging device 10 and an optical sensor 20. The optical sensor 20 is arranged on the image side of the optical imaging device 10.

The optical sensor 20 can be a CMOS (complementary metal oxide semiconductor) sensor or a charge coupled device (CCD).

In the imaging module 100, through arrangements of the refractive powers and the contouring of the fourth lens L4 and the fifth lens L5, a rear focal length of the optical imaging device 10 is effectively reduced, thereby shortening a total optical length of the optical imaging device 10. The optical imaging device 10 has a small size, which can be applied in an electronic device of a small size. At the same time, a high refractive power being concentrated in a single lens is avoided, thereby reducing the sensitivity of the optical imaging lens 10, the optical imaging lens 10 may have a stable imaging quality and may be manufactured easily. In addition, through control of the values of TF5/FOV and TL4/FNO, refraction angles of incident light are slowly and gradually changed when the incident light enters the optical imaging device 10, large aberrations of the optical imaging device 10 are avoided, stray light is reduced, and the imaging quality may be stable.

Figure 14:
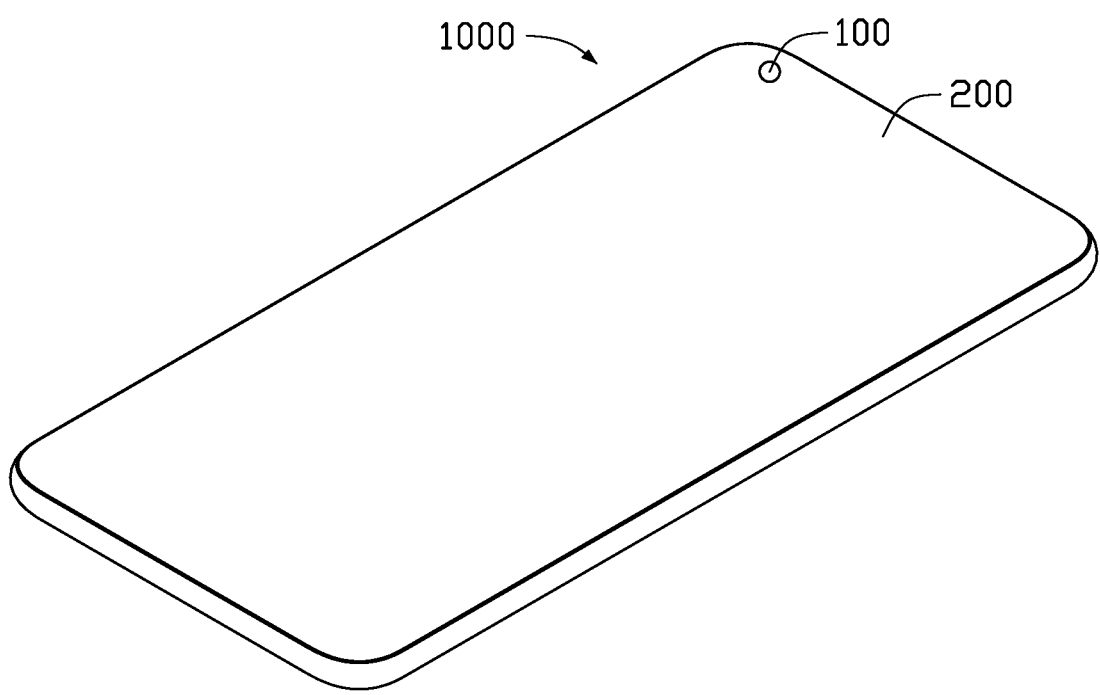
FIG. 14 is a diagrammatic view of an embodiment of an electronic device using an optical imaging device in one embodiment according to the present disclosure.

Referring to FIG. 14, an embodiment of an electronic device 1000 is further provided, which includes the imaging module 100 and a housing 200. The imaging module 100 is mounted on the housing 200.

The electronic device 1000 can be a smart phone, a tablet computer, a notebook computer, an e-book reader, a portable multimedia player (PMP), a portable telephone, a video telephone, a digital camera, a mobile medical device, a wearable device, etc.

In the electronic device 1000, through the arrangement of refractive powers and the contouring of the fourth lens L4 and the fifth lens L5, a rear focal length of the optical imaging device 10 is effectively reduced, thereby shortening a total optical length of the optical imaging device 10. The optical imaging device 10 has a small size, which can be applied in an electronic device of a small size. At the same time, a concentration of refractive power in a single lens is avoided, thereby reducing the sensitivity of the optical imaging lens 10, the optical imaging lens 10 may have a stable imaging quality and may be manufactured easily. In addition, through control of the values of TF5/FOV and TL4/FNO, a refraction angle of incident light can change gently when the incident light enters the optical imaging device 10, excessive aberrations of the optical imaging device 10 are avoided, stray light is reduced, and the imaging quality may be stable.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical imaging device, from an object side to an image side, comprising:
   a first lens having a refractive power;
   a second lens having a refractive power;
   a third lens having a refractive power;
   a fourth lens having a negative refractive power, wherein an image-side surface of the fourth lens is convex near an optical axis of the optical imaging device; and
   a fifth lens having a negative refractive power, wherein an image-side surface of the fifth lens is concave near the optical axis;
   wherein the optical imaging device satisfies the following formulas:

$0.03\ mm/° < TL5/FOV < 0.1\ mm/°$ and $2.4\ mm < TL4/FNO < 2.9\ mm$;

wherein, TL5 is a distance from an object-side surface of the fifth lens to an image plane of the optical imaging device along the optical axis, FOV is a maximum field of view of the optical imaging device, TL4 is a distance from an object-side surface of the fourth lens to the image plane along the optical axis, and FNO is a F-number of the optical imaging device.

2. The optical imaging device of claim 1, wherein the object-side surface of the fifth lens is concave near the optical axis, the object-side surface of the fifth lens is concave near a circumference of the fifth lens, and the image-side surface of the fifth lens is convex near the circumference.

3. The optical imaging device of claim 1, further satisfying the following formula:

$0.3 < Imgh/f < 0.6$;

wherein, Imgh is a half of an image height corresponding to FOV, and f is an effective focal length of the optical imaging device.

4. The optical imaging device of claim 1, further satisfying the following formula:

$0.4 < TL4/f < 1$;

wherein f is an effective focal length of the optical imaging device.

5. The optical imaging device of claim 1, further satisfying the following formula:

$0.2 < TL5/f < 0.6$;

wherein f is an effective focal length of the optical imaging device.

6. The optical imaging device of claim 1, further satisfying the following formula:

$0.7 < TL/f < 1.7$;

wherein, TL is a distance from an object-side surface of the first lens to the image plane along the optical axis, and f is an effective focal length of the optical imaging device.

7. The optical imaging device of claim 1, further satisfying the following formula:

$1.8 < f/EPD < 2.8$;

wherein, f is an effective focal length of the optical imaging device, and EPD is an entrance pupil diameter of the optical imaging device.

8. The optical imaging device of claim 1, further satisfying the following formula:

$40° < FOV < 60°$.

9. An imaging module, comprising:
   an optical imaging device, from an object side to an image side, comprising:
      a first lens having a refractive power;
      a second lens having a refractive power;
      a third lens having a refractive power;
      a fourth lens having a negative refractive power, wherein an image-side surface of the fourth lens is convex near an optical axis of the optical imaging device; and
      a fifth lens having a negative refractive power, wherein an image-side surface of the fifth lens is concave near the optical axis; and
   an optical sensor arranged on the image side of the optical imaging device;
   wherein the optical imaging device satisfies the following formulas:

$0.03\ mm/° < TL5/FOV < 0.1\ mm/°$ and $2.4\ mm < TL4/FNO < 2.9\ mm$;

wherein, TL5 is a distance from an object-side surface of the fifth lens to an image plane of the optical imaging device along the optical axis, FOV is a maximum field of view of the optical imaging device, TL4 is a distance from an object-side surface of the fourth lens to the image plane along the optical axis, FNO is a F-number of the optical imaging device.

10. The imaging module of claim 9, wherein the object-side surface of the fifth lens is concave near the optical axis, the object-side surface of the fifth lens is concave near a circumference of the fifth lens, and the image-side surface of the fifth lens is convex near the circumference.

11. The imaging module of claim 9, wherein the optical imaging device further satisfies the following formula:

$0.3 < Imgh/f < 0.6$;

wherein, Imgh is a half of an image height corresponding to FOV, and f is an effective focal length of the optical imaging device.

12. The imaging module of claim 9, wherein the optical imaging device further satisfies the following formula:

$0.4 < TL4/f < 1$;

wherein f is an effective focal length of the optical imaging device.

13. The imaging module of claim 9, wherein the optical imaging device further satisfies the following formula:

$0.2 < TL5/f < 0.6$;

wherein f is an effective focal length of the optical imaging device.

14. The imaging module of claim 9, wherein the optical imaging device further satisfies the following formula:

$0.7 < TL/f < 1.7$;

wherein, TL is a distance from an object-side surface of the first lens to the image plane along the optical axis, and f is an effective focal length of the optical imaging device.

15. The imaging module of claim 9, wherein the optical imaging device further satisfies the following formula:

$1.8 < f/EPD < 2.8$;

wherein, f is an effective focal length of the optical imaging device, and EPD is an entrance pupil diameter of the optical imaging device.

16. The imaging module of claim 9, wherein the optical imaging device further satisfies the following formula:

$$40°<FOV<60°.$$

17. An electronic device, comprising:
a housing; and
an imaging module mounted on the housing, the imaging module comprising:
an optical imaging device, from an object side to an image side, comprising:
a first lens having a refractive power;
a second lens having a refractive power;
a third lens having a refractive power;
a fourth lens having a negative refractive power, wherein an image-side surface of the fourth lens is convex near an optical axis of the optical imaging device; and
a fifth lens having a negative refractive power, wherein an image-side surface of the fifth lens is concave near the optical axis; and
an optical sensor arranged on the image side of the optical imaging device;
wherein the optical imaging device satisfies the following formulas:

$$0.03 \text{ mm/°} < TL5/FOV < 0.1 \text{ mm/°} \text{ and } 2.4 \text{ mm} < TL4/FNO < 2.9 \text{ mm};$$

wherein, TL5 is a distance from an object-side surface of the fifth lens to an image plane of the optical imaging device along the optical axis, FOV is a maximum field of view of the optical imaging device, TL4 is a distance from an object-side surface of the fourth lens to the image plane along the optical axis, FNO is a F-number of the optical imaging device.

18. The electronic device of claim 17, wherein the object-side surface of the fifth lens is concave near the optical axis, the object-side surface of the fifth lens is concave near a circumference of the fifth lens, and the image-side surface of the fifth lens is convex near the circumference.

19. The electronic device of claim 17, wherein the optical imaging device further satisfies the following formula:

$$0.3 < Imgh/f < 0.6;$$

wherein, Imgh is a half of an image height corresponding to FOV, and f is an effective focal length of the optical imaging device.

20. The electronic device of claim 17, wherein the optical imaging device further satisfies the following formula:

$$0.4 < TL4/f < 1;$$

wherein f is an effective focal length of the optical imaging device.

* * * * *